United States Patent [19]
Perry

[11] 4,427,344
[45] Jan. 24, 1984

[54] HELICOPTER ROTOR BLADE

[75] Inventor: Frederick J. Perry, Sherborne, England

[73] Assignee: Westland Aircraft, Ltd., Yeovil, England

[21] Appl. No.: 243,498

[22] Filed: Mar. 13, 1981

[30] Foreign Application Priority Data

Mar. 28, 1980 [GB] United Kingdom ............... 8010639

[51] Int. Cl.³ .............................................. B64C 27/46
[52] U.S. Cl. ................................. 416/223 R; 416/228; 416/237
[58] Field of Search ............... 416/228, 223 R, 228 A, 416/237 A

[56] References Cited

U.S. PATENT DOCUMENTS

| | | | |
|---|---|---|---|
| 3,721,507 | 3/1973 | Monteleone | 416/228 A |
| 3,822,105 | 7/1974 | Jepson | 416/228 A |
| 4,248,572 | 2/1981 | Fradenburgh | 416/228 |

Primary Examiner—Harvey C. Hornsby
Assistant Examiner—Christine A. Peterson
Attorney, Agent, or Firm—Larson and Taylor

[57] ABSTRACT

A helicopter rotor blade is disclosed having a root end for attachment to a rotor head, a tip end defining the end of the blade fartherest from the root end with a central portion of aerofoil section extending between and attached to the root end and the tip end to define a rotor radius wherein an outboard region of the central portion has a negative basic pitching moment coefficient of absolute value not less than 0.02 and an inboard region having a basic pitching moment coefficient more positive than that of the outboard region.

13 Claims, 7 Drawing Figures

HELICOPTER ROTOR BLADE

DESCRIPTION OF INVENTION

This invention relates to helicopter rotor blades. A significant proportion of the empty weight of a helicopter is made up of the main rotor system, including the rotor blades and the hub, and the weight of this system is directly related to the blade area required to achieve a given speed-weight-altitude performance capability. Generally the higher the blade loading level utilised, the lighter will be the blades and hub, and the greater will be the aircraft's disposable load.

Usually, the maximum blade loading level that may be used is determined by the aerodynamic processes which limit the rotor operating envelope in forward flight. These processes generally involve drag rise or flow separations over some portion of the rotor blades. On the advancing blades where the forward speed of the helicopter is added to the rotational velocity of the rotor blade, high Mach numbers can be attained with resulting drag rise and, ultimately, shock induced separations. Experience has shown that advancing blade limiting conditions may be penetrated by considerable margins, but other rotor limitations are more severe.

On the retreating side of the rotor disc, where the blades operate at low relative airspeed and high incidence, blade stalling can take place. The low speed stalling process produces large blade twisting moments as the flow adjusts from its attached flow to its separated flow state. Since rotor blades are usually quite supple, particularly in torsion, a high amplitude torsional motion can develop and persist as the blade continues to rotate. This phenomenon, known as stall flutter, results in high structural loads and very high power levels, and can result in difficulties in maintaining the rotor in its desired trim state. All these effects grow rapidly worse as the rotor envelope is exceeded, making retreating blade stall flutter the fundamental limitation of the rotor in forward flight.

Accordingly, in one aspect, the invention provides a helicopter rotor blade having a root end for attachment to a rotor head, a tip end defining the end of the blade farthest from the root end, and a central portion of aerofoil section extending between and attached to the root end and the tip end and co-operating therewith to define a rotor radius wherein an outboard region of the central portion has a negative basic pitching moment coefficient greater in absolute value than that of an inboard region thereof.

The outboard region may comprise a region outboard of a seventy percent rotor radius station and may extend between said seventy percent station and an eighty percent radius station. Preferably, the inboard and outboard regions and the outboard and tip regions are blended smoothly together.

The outboard region may have a negative basic pitching moment coefficient greater in absolute value than 0.02.

The respective pitching moment characteristics of the inboard and outboard regions of the central portion may be obtained by camber distribution in the respective aerofoil sections, and the camber of the aerofoil section of the inboard region may comprise a reflex camber.

The tip end may be swept rearwardly with respect to the central portion and may have a thickness to chord ratio less than that of the central portion.

In another aspect the invention provides a helicopter rotor blade having a root end for attachment to a rotor head, a tip end defining the end of the blade farthest from the root end and a central portion of aerofoil section extending between and attached to the root end and the tip end and co-operating therewith to define a rotor radius, wherein the outboard region has a negative basic pitching moment coefficient and the inboard region has a positive basic pitching moment coefficient.

Preferably said negative and positive basic pitching moment coefficients have an absolute value greater than 0.02. The basic pitching moment coefficient of the outboard regions may be between minus 0.02 and minus 0.04 and the basic pitching moment coefficient of the inboard region may be between 0.02 and 0.04.

The invention will now be described by way of example only and with reference to the accompanying drawings in which.

In this description, the following symbols have been used to identify various parameters as follows:

| | |
|---|---|
| N | blade number |
| c | blade chord |
| R | blade radius |
| $\Omega$ | rotor rotational speed |
| $\Omega R$ | rotor tip speed |
| s | rotor solidity |
| $C_T = T/\frac{1}{2}\rho N c R \overline{\Omega R}^2$ | thrust coefficient |
| T | rotor thrust |
| M | free stream Mach number |
| x | non-dimensional radial station |
| $\psi$ | azimuth angle |
| P | air density |
| $\mu, \mu_x$ | advance ratio |
| V | forward speed |
| $C_L$ | lift coefficient |
| $C_{LMAX}$ | maximum lift coefficient |
| $C_M$ | pitching moment coefficient (positive-nose up) |
| $C_{Mo}$ | basic pitching moment coefficient (positive-nose up) |
| $C_{MRES}$ | residual pitching moment coefficient (positive-nose up) |
| $C_{M(\alpha\, M\, \infty)}$ | pitching moment increment due to incidence (positive-nose up) |
| $\alpha$ | incidence |
| P(X) | blade first torsion mode shape |
| e | a radial station. |

Figure 1:
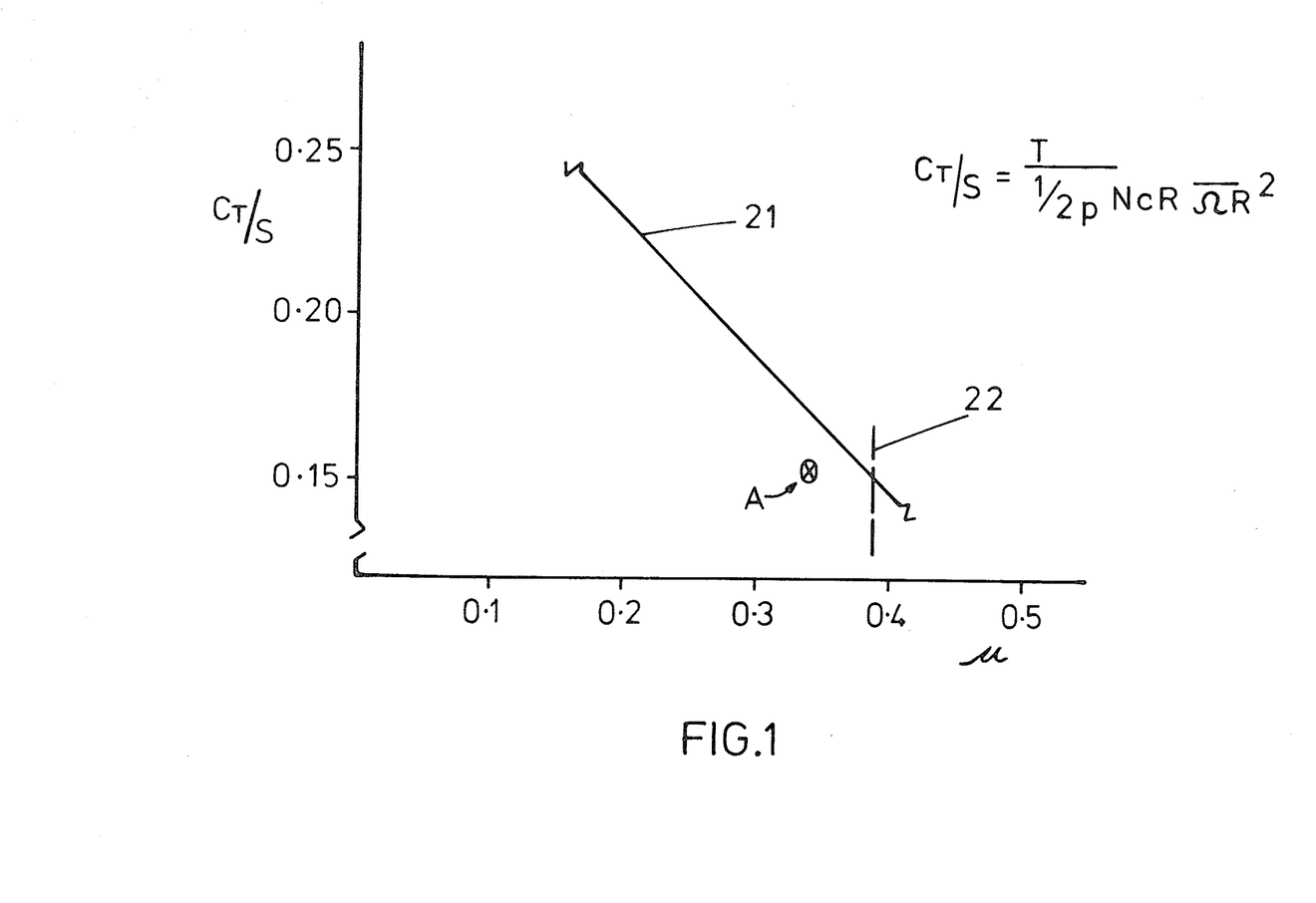
FIG. 1 is a graph illustrating a typical rotor blade operating envelope.

A typical rotor envelope is shown in FIG. 1, expressed in terms of a non-dimensional blade loading coefficient, $C_{T/S}$ and a non-dimensional forward speed or advance ratio, $\mu$. The retreating blade stall flutter limit indicated at 21 is shown as a function of advance ratio alone. For a particular rotor tip speed, the advancing blade high Mach number 'soft' limit 22 may be placed on the same diagram as shown.

FIG. 1 shows that the higher the advance ratio required of the rotor, the lower is the maximum allowable blade loading. For an aircraft of a given weight, the higher the design speed, the greater will be the required blade area, and the higher will be the aircraft's empty weight fraction. A typical rotor blade design point is indicated at A on FIG. 1.

Since the retreating blade limit is produced by rotor blade stalling, and rotor blade stalling is directly related to the performance of the rotor blade aerofoil section shape, an improvement in aerofoil section characteristics leads directly to an improvement in the rotor envelope or allowable blade loading. A large body of information and techniques has been developed, largely for fixed wing applications, which may be applied directly to rotor blade design, and the introduction of improved aerofoil sections has yielded significant increases in helicopter performances recently. There are, however, special constraints in the rotor blade application which have up to now placed premature limits on rotor blade aerofoil section design.

Thus, it is recognised that improved aerofoil section performance may be used to reduce motor blade areas and rotor system weight, or, for the same blade area, to increase aircraft gross weight, speed or altitude capability. Alternatively, as noise requirements become more stringent, improved aerofoil section performance may be used to reduce rotor blade tip speeds.

Currently, noise constraints limit the usefulness of making improvements to the low incidence—high Mach number performance of rotor blade aerofoil sections, which would allow the use of increased tip speeds. Accordingly, attention has been concentrated on improving the high incidence—low Mach number performance of sections to push back the rotor limit imposed by retreating blade stalling.

There are two general approaches to improving aerofoil section high incidence performance at low Mach numbers, nose droop and aft loading, both of which involve increasing section camber. However, the addition of camber means an increase in the aerofoil section basic pitching moment, which can lead to large increases in blade twisting moments, which in the absence of blade stalling, would otherwise be small.

Figure 2:
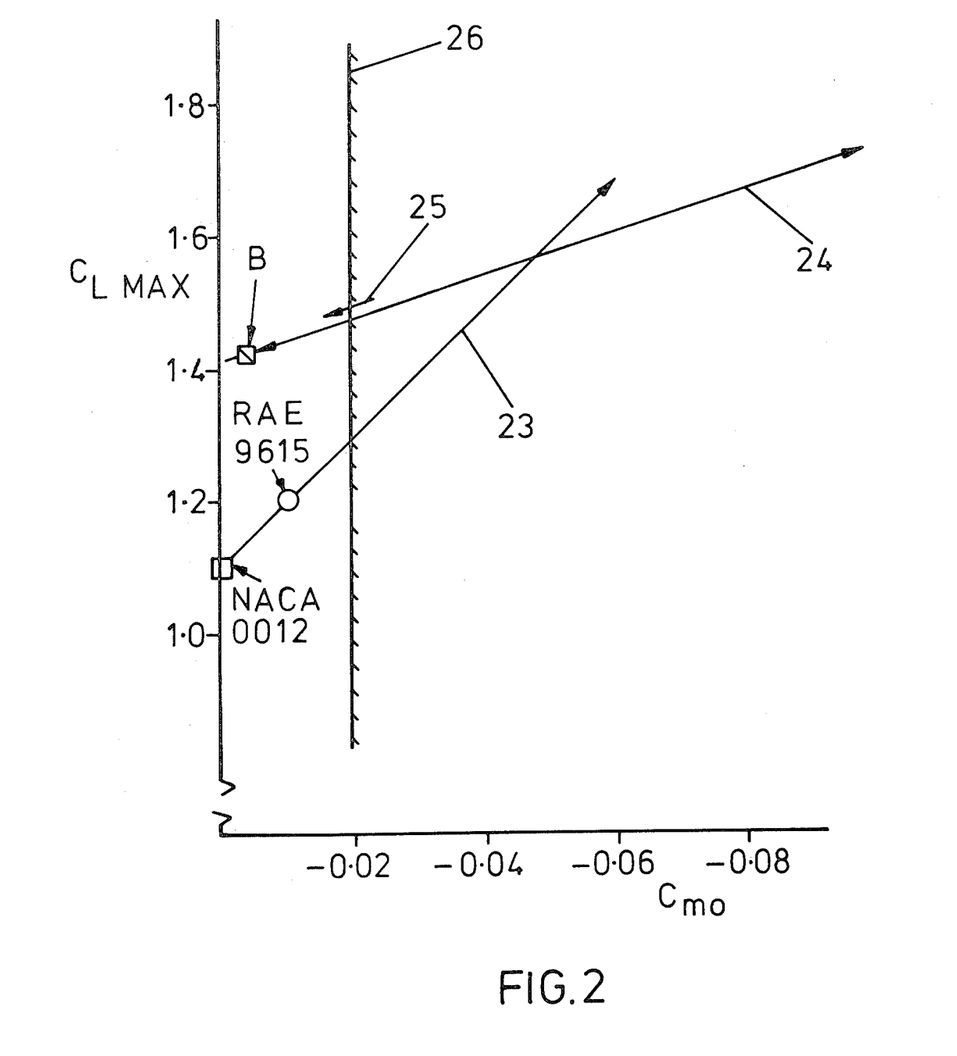
FIG. 2 is a graph illustrating two approaches resulting in improvements in aerofoil section high incidence performance at low mach numbers.

Possible improvements in high incidence performance and attendant penalties in the basic pitching moment of various aerofoil sections are shown in FIG. 2. Maximum allowable blade loading may be assumed to be directly proportional to the rotor blade section $C_{LMAX}$ illustrated in respect of low Mach number aerofoil high incidence performance where $M\infty = 0.4$, and it can be seen that very large improvements over the datum section NACA 0012 may be achieved. The figure shows that nose droop indicated by line 23 representative of increasing nose droop and constant (zero) aft loading is much more efficient (in terms of basic pitching moment levels) in increasing section high incidence performance, since the basic or camber loading is concentrated near the quarter chord of the section. RAE 9615 aerofoil section was derived directly from NACA 0012 by the addition of nose droop while leaving the aft part of the aerofoil section unaltered, thus producing a worthwhile increase in $C_{LMAX}$ for a small increase in basic moment. More recent high performance sections indicated at B in FIG. 2 make use of greater nose droop, and contain basic pitching moment growth by means of trailing edge reflex or reversed aft-loading, as indicated by line 24 representative of increased aft loading and constant nose droop. The direction of increased reflex camber is indicated by arrow 25.

A limit is soon reached, however, where further increases in nose droop become detrimental to the performance of the aerofoil section in the advancing blade environment of low or negative incidence and high Mach number. Further improvement in high incidence performance may then only be obtained by the addition of camber further aft. Unfortunately, this aft loading is quite efficient at producing basic pitching moments about the section quarter chord, preventing the application of highly aft loaded sections to rotors with relatively supple blades such as the helicopter main rotor. In this application section basic pitching moments have been generally restricted to values smaller in absolute level than 0.02, as indicated at 26 in FIG. 2.

It was therefore considered worthwhile to look more closely at the consequences of high basic pitching moment sections on the rotor with the aim of identifying a technique by means of which the performance of aft loaded sections may be exploited.

It has been found useful to represent the pitching moment about an aerofoil section quarter-chord as follows:

$$C_M = C_{Mo} \frac{1}{\sqrt{1 - M\infty^2}} + C_{MRES}(M\infty) + \Delta C_M(\alpha M\infty)$$

The total pitching moment is made up of three parts:

1. The basic pitching moment $C_{mo}$, usually measured near zero lift in incompressible conditions, is independent of incidence and, following thin aerofoil theory practice, may be modified by the Prandtl-Glauert factor to account for subcritical compressibility effects.

Figure 3:
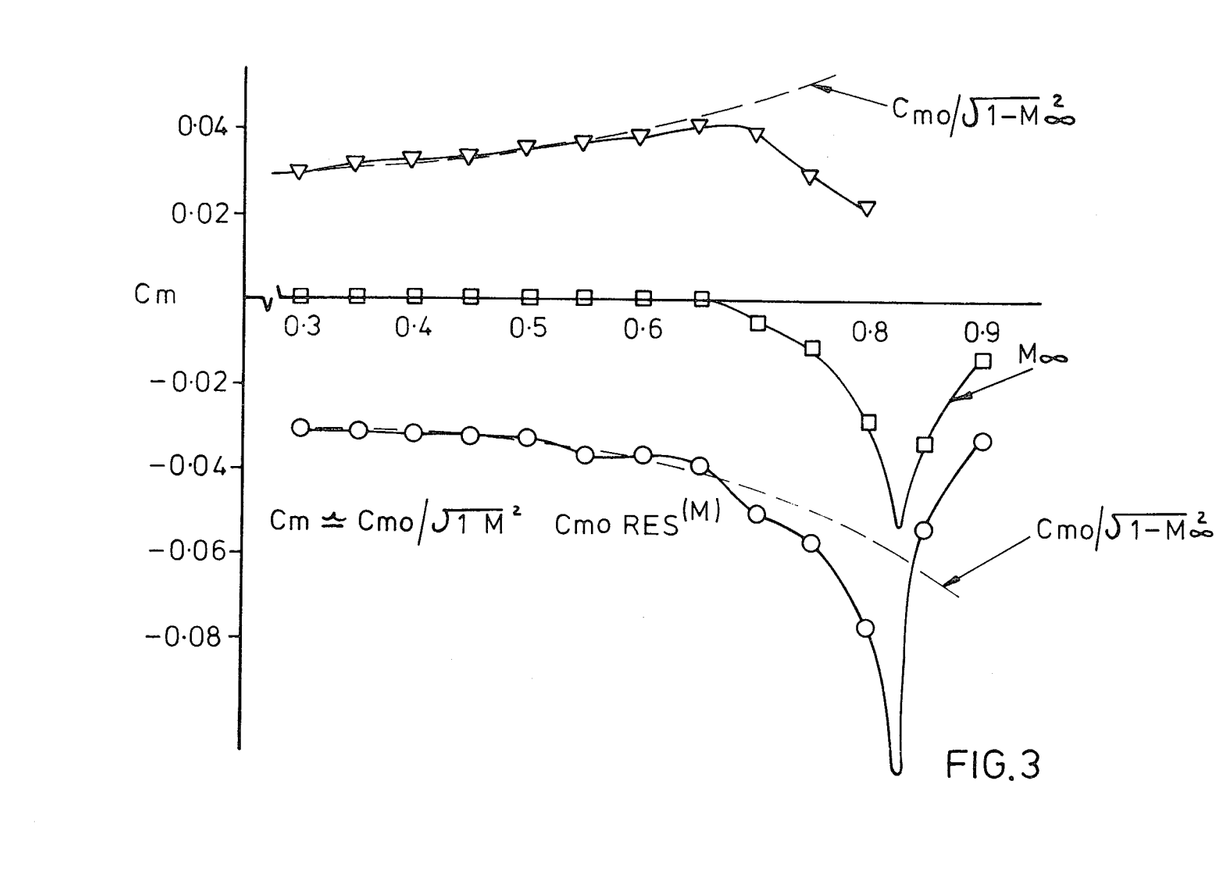
FIG. 3 is a graph illustrating residual pitching moment characteristics of a family of aerofoil sections with various aft camber distributions and the same nose geometry.

2. A residual pitching moment, usually measured at zero lift, which arises under supercritical flow conditions due to the asymetry of shock strengths and positions between the aerofoil upper and lower surface. This term appears with the introduction of nose droop and experience has shown it to be practically independent of the camber of the rear portion of the aerofoil. Thus a family of aerofoils with various aft camber distributions and the same nose geometry can be expected to exhibit very similar residual pitching moment characteristics. This is illustrated in FIG. 3 in which the symbol $\nabla$ represents a reflexed section, the symbol $\square$ a zero basic moment section and the symbol $\bigcirc$ an aft-loaded section.

3. An additional pitching moment which is primarily a function of incidence $\alpha$ and which is primarily associated with viscous effects, the thickening of the aerofoil boundary layer and the onset of local flow separation. Qualitatively these effects are common to all aerofoils, irrespective of camber distribution. Quantitatively they are also quite similar from aerofoil to aerofoil, but since they are produced by processes which ultimately lead to stall, they are more closely related to the stalling angle of incidence which varies from aerofoil to aerofoil.

When considering the introduction of camber to the rotor, only changes in the nature of the pitching moment are of significance; thus, the incidence dependant pitching moment contributions may be neglected since they will affect the rotor in the same fashion regardless of the aerofoil section employed. The introduction of nose droops gives rise immediately to the residual pitching moment term, but since this term is zero except under supercritical conditions, it affects only a small portion of the rotor disc on the advancing side. Experience has shown that quite high levels of nose droop and the resulting residual moment may be tolerated in helicopter main rotor applications with the limitations on the extent of nose droop employed related more to section drag and power consumption than blade twisting moment levels.

The remaining term involves $C_{mo}$ which depends purely on the camber line of the aerofoil section. This term can be made extremely large, especially if camber is added near the trailing edge. Addition of reflex or reverse camber near the trailing edge can reverse the sense of the total pitching moment. Small amounts of trailing edge reflex have been used to zero the basic pitching moment term for aerofoils employing large nose droop values. The addition of aft loading will involve this term only.

Considering the basic pitching moment term alone, the local blade twisting moment may be written:

$$dM = \tfrac{1}{2}\rho c^2 R \overline{\Omega R}^2 (x + \mu_x \sin\psi) \left( \frac{C_{Mo}}{\sqrt{1 - M_\infty^2}} \right) dx$$

Making the further assumption usually employed in simple rotor blade flapping analyses that the variation in moment coefficient due to compressibility is of secondary importance:

$$dM \simeq \tfrac{1}{2}\rho c^2 R \overline{\Omega R}^2 (x + \mu_x \sin\psi)^2 dx C_{Mo}$$

The moment varies around the disc with the local dynamic head and may be re-expressed in terms of harmonics of azimith angle:

$$dM \simeq \tfrac{1}{2}\rho c^2 R \overline{\Omega R}^2 C_{Mo} \left[ \left( x + \frac{\mu_x^2}{2} \right) + 2\mu_x \times \sin\psi - \frac{\mu_x}{2} \sin 2\psi \right] d_x$$

There are steady $1\Omega$ and $2\Omega$ twisting moment components which can result in large steady and vibratory blade root moments when integrated with respect to radius and in large blade torsional deflections. Of particular importance is the once per rev component which can act as a pseudo-cyclic pitch input and may lead to rotor control difficulties.

If a conventional aft-loaded aerofoil is employed $C_{mo}$ is negative or nose down, and the once per rev component of the blade twisting moment acts to decrease pitch on the advancing blade, causing a conventional rotor to flap forward and increase its forward speed. Since the original twisting moment is proportional to forward speed, a speed instability is possible. This component also leads to a flattening of the usual control gradients and can lead to control reversals especially in rotor blades employing an aft-loaded aerofoil section uniformly throughout their span.

However, helicopter rotor blades do not require a high level of aerodynamic performance uniformly throughout their spans, and this invention utilises this feature to provide a technique by which the benefits of aft-loaded aerofoil sections may be extended to helicopter main rotor blades or the rotor blades of autogyros which previously were too soft in torsion to make use of such sections.

Figure 4:
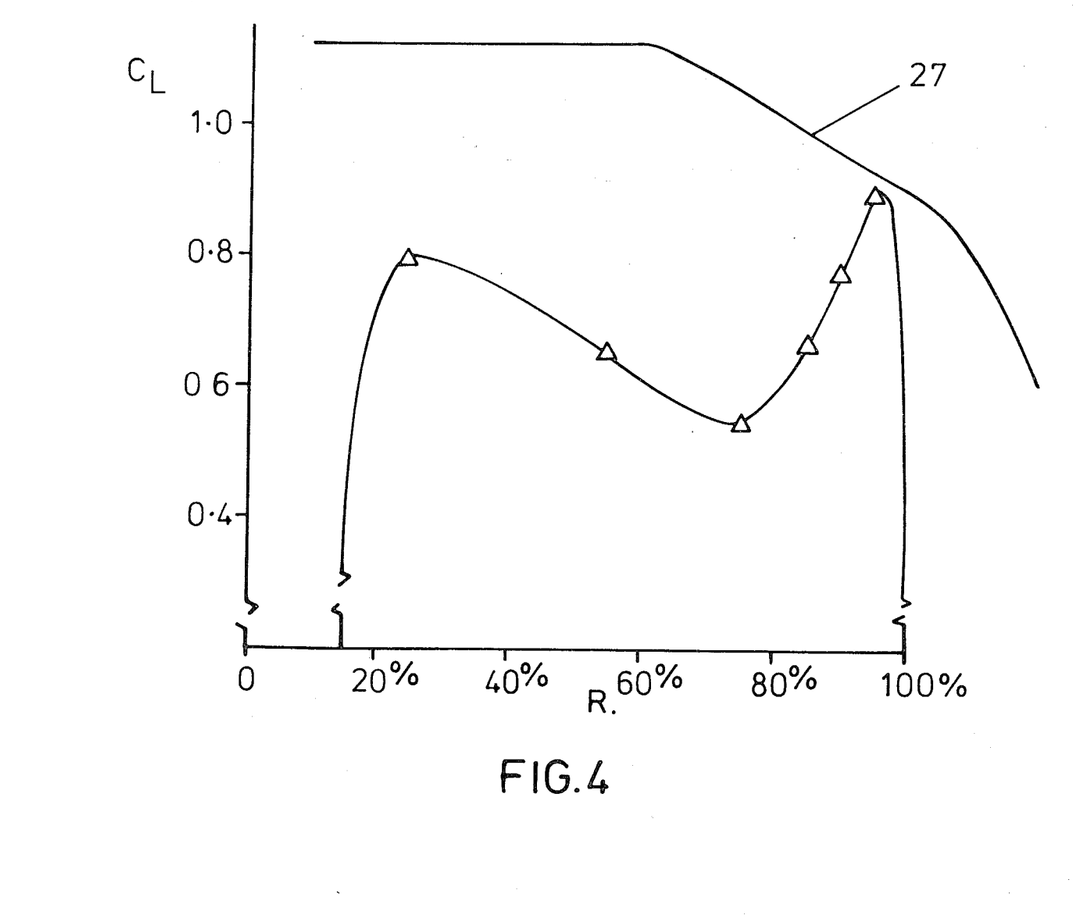
FIG. 4 is a graph illustrating a typical blade lift distribution in hover mode.

In the helicopter hover mode the maximum lift coefficients occur near the rotor blade tips, where there occurs a loading peak associated with in-flow induced by the trailing vortex of the preceding blade. Also, since local Mach number rises toward the tip, the stall limit of the blade aerofoil section falls toward the tip as indicated by line 27 in FIG. 4 in respect of a blade of uniform NACA 0012 section. This situation is shown typically in FIG. 4 indicating that in the hover the critical radial station is near the blade tip (100 percent rotor radius station) and that a considerable margin of performance exists for inboard sections when the tip section meets its limit.

Figure 5:
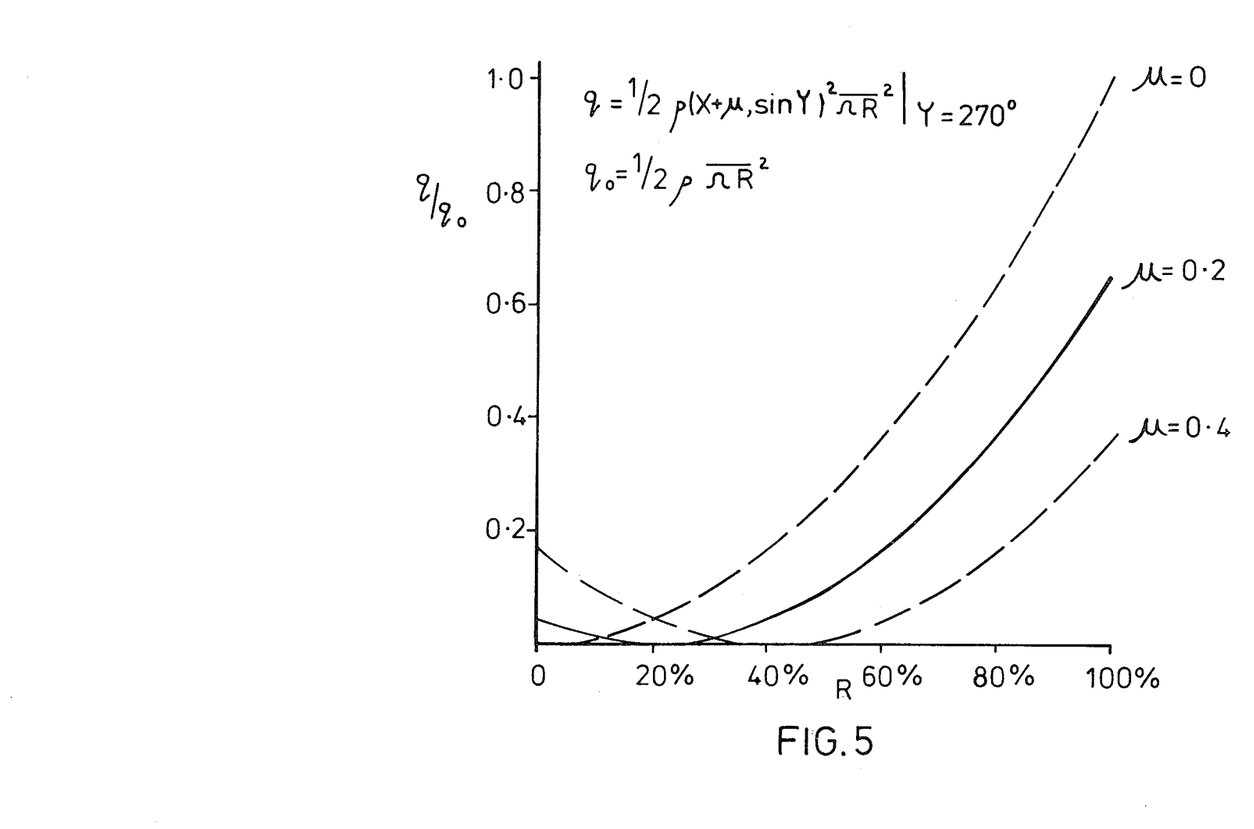
FIG. 5 is a graph illustrating the retreating blade distribution of dynamic head, FIG. 6 includes a plan view of a helicopter rotor blade constructed in accordance with one embodiment of the invention, and showing a typical aerofoil section distribution.

In forward flight, on the critical retreating blade, experimental results have shown that the highest lift coefficients occur on the outboard regions of the motor blade. As forward speed increases and the reversed flow region expands, loading is concentrated more and more in the outboard region of the retreating blade. Usually the outboard region is more critical with respect to the onset of stall than the inboard regions of the blade. A second factor, the local dynamic head, proportioned to $q/q_o$ also influences the retreating blade limiting behaviour. When the blade stalls locally the resulting twisting moment will be proportional to some characteristic delta-change in pitching moment coefficient times the local dynamic head. As forward speed increases and the reversed flow region expands on the retreating blade, the region of low dynamic head shifts further and further outboard as shown in FIG. 5 for rotor blades operating with aspect ratios of 0.4, and 0.2 and in the hover mode. Stalling of the blade section in the inboard region will not, therefore, lead to high twisting moments due to the low local dynamic head, whereas stalling in the outboard region will lead to large impulsive loads due to the dynamic head there. For both these reasons it was decided that an aerofoil section of lower performance could be tolerated for use on an inboard region of a helicopter rotor blade.

The extent of the less critical inboard region depends on the design speed of the rotor. Generally as the design speed rises, the inboard region expands and a rotor blade according to this invention employs a reflex camber distribution or sections of reduced camber in this inboard region to counteract the undesirable effects of a high camber aerofoil section utilised in an outboard region in order to improve overall blade performance. As the rotor design speed rises, and the highest section performance requirements become more concentrated radially, this technique becomes increasingly powerful.

Thus, a rotor blade constructed in accordance with this invention exploits the performance advantages of aft-loaded aerofoil sections, or indeed any section which derives improved stalling performance at the expense of elevated basic pitching moment, based on the fact that inboard aerofoil sections do not require as high a performance ($C_{LMAX}$) as do outboard sections, and need not satisfy the same performance constraints. The invention utilises aerofoil sections with a high degree of reflex or reverse aft-loading in an inboard region of the blade span in combination with a high performance outboard region in order to reduce or zero the net blade aerodynamic moment. It has been found that the reduction in $C_{LMAX}$ of inboard sections associated with reflex (see FIG. 2) can be tolerated in such a configuration.

The first step in defining the geometry of a rotor blade according to this invention is to consider the region in which the highest performance will be required, i.e., the region in which the product of local incidence ($C_L$) times local dynamic head is highest on the retreating side of the rotor disc. This region will generally be outboard of seventy percent rotor radius for rotors designed for high speed operation and will end somewhat inboard of the tip. The highly cambered section of the outboard region need not be extended to the extreme blade tip since tip effects tend to reduce incidence requirements in this area. It may, therefore, be advantageous to washout camber, in particular leading edge droop, and aerofoil thickness at the tip end of a rotor blade to obtain drag advantages on the advancing blade. In other embodiments, the highly cambered section of highest retreating blade performance may extend to the tip to ease manufacture.

Figure 6:
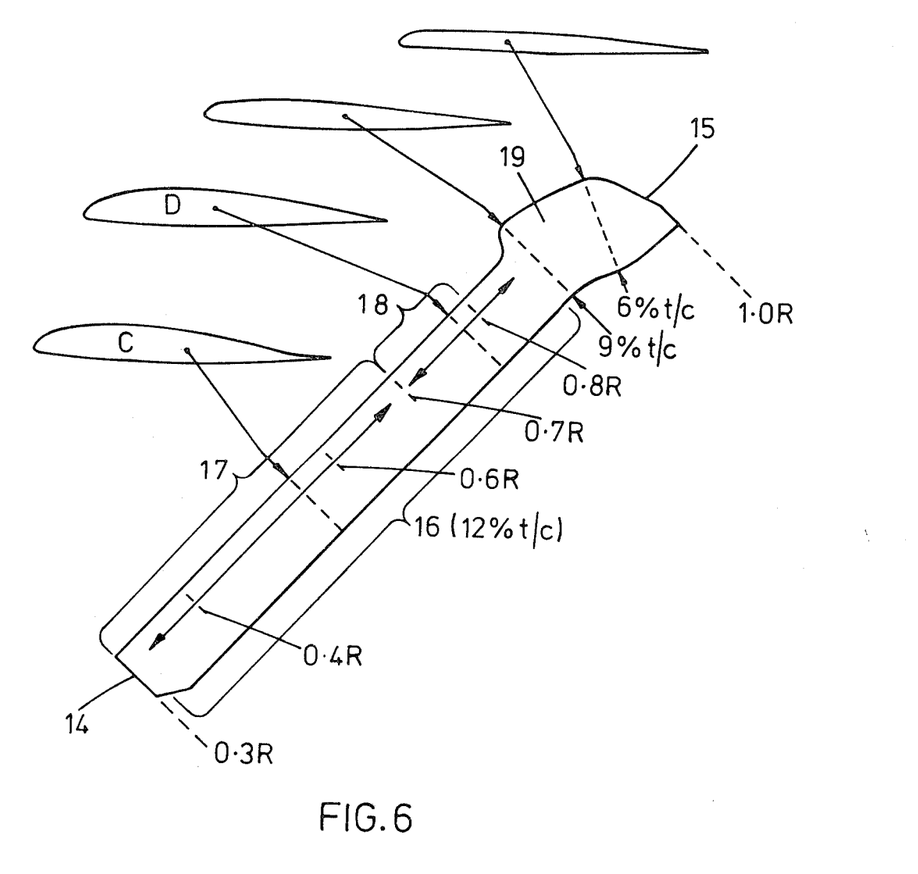

Referring now to FIG. 6, a helicopter rotor blade constructed in accordance with one embodiment of the invention includes a root end 14 for attachment to a helicopter rotor head (not shown), and a tip end 15. It will be noted in the illustrated embodiment that the root end 14 is located at a thirty percent (0.3R) rotor radius station, i.e., thirty percent of the rotor radius (1.0R) from the axis of rotation of the rotor blade. A central portion 16 having a constant thickness to chord ratio of twelve percent extends between the root 14 and the tip 15 and together define an operating rotor blade radius (1.0R).

As illustrated, an inboard region 17 of the rotor blade extending to the seventy percent rotor radius station (0.7R) comprises a reflexed camber aerofoil section C, and an outboard region 18 between the seventy percent and eighty percent rotor radius (0.8R) stations comprises an aft-loaded aerofoil section D. The tip of the blade comprises a rearwardly swept portion 19 of progressively thinned aerofoil section, and is constructed as disclosed in U.K. Patent Specification Ser. No.: 1,538,055.

Figure 7:
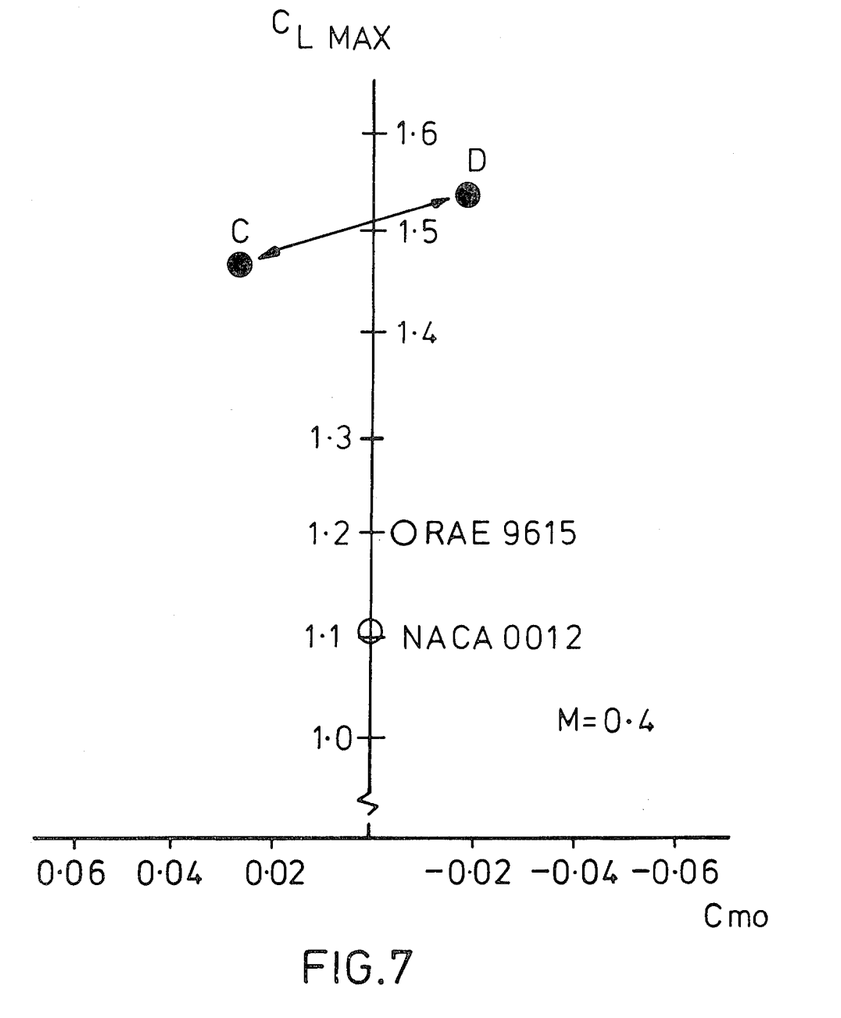
FIG. 7 illustrates the maximum lift coefficient and basic pitching moment coefficient of the various sections of the rotor blade of FIG. 6.

The basic characteristics of aerofoil sections C and D are shown on FIG. 7 and it will be seen that section D in the outboard region exhibits a high static maximum lift coefficient between 1.5 and 1.6 and a negative basic pitching moment coefficient between minus 0.02 and minus 0.04, whereas section C in the inboard region has a reduced static maximum lift coefficient between 1.4 and 1.5 and a positive basic pitching moment coefficient between 0.02 and 0.04. Corresponding values for existing rotor blade sections NACA 0012 and RAE 9615 are illustrated on FIG. 7.

Thus, to summarise, the helicopter rotor blade of this invention makes use of a highly cambered aerofoil section or sections where an an absolute value of $C_{Mo} > 0.02$ either through aft loading or extreme nose droop in an outboard region whose extent is influenced by aerodynamic performance considerations, and inboard of which the blade camber is either reduced or reflexed to offset the undesirable effects of the outboard region camber. In other words, in terms of the pitching moment, the outboard region 18 has a basic nose down pitching moment greater than that of the inboard region 17. These two regions may be blended smoothly together. The outboard region of high camber need not extend to the extreme blade tip. In fact, such a region may be employed inboard of a tip of modified geometry employing sweep, taper, planform area change and so forth as shown in FIG. 6, provided its undesirable pitching moment effects are counteracted by the camber distribution of the inboard region of the blade. The degree and distribution of camber in the inboard region depends on the radial extent of the outboard region and the amount of camber employed there, upon the stiffness of the blade in torsion and the amount of torsional motion which can be tolerated and upon the blade planform geometry.

The following example is provided for explanatory purposes:

Consider a blade of rectangular planform for simplicity, employing a single aerofoil section of high basic pitching moment $C_{Mo1}$ in an outboard region extending from radial station e to the tip. This is a simplified case and in general the section may vary down the blade, the camber may be washed out near the tip or a tip of non rectangular planform may be employed. Inboard of station e a section of basic pitching moment $C_{Mo2}$ is employed. In general the inboard camber distribution may vary but for the purposes of containing the twisting moment effects of the outboard region, $C_{Mo2}$ will be less nose down than $C_{Mo1}$.

Two objectives are identified for this example:

(1) to reduce the control loads introduced by the camber of the outboard aerofoil section region, and (2) to reduce the first harmonic torsional blade motion produced by the twisting moment of the outboard region which can lead to rotor control problems since it can directly affect rotor disc attitude and thrust.

The radial station e is established from rotor performance considerations. In general a blend region or a continuous variation camber may be employed between the inboard and outboard regions.

As hereinbefore described, the basic pitching moment produces torsional forcing at frequencies of up to twice the rotor rotational speed. But the fundamental blade torsion mode natural frequency is seldom less than 4/rev, therefore the motion of the blade may be treated approximately as a static deflection problem. In other words, torsional inertia moment will be small with respect to the applied moments. The control system loads due to the basic moment are therefore approximately the integral of the local applied moments:

$$M_{ROOT} \stackrel{\Omega}{=} \int_o^l \tfrac{1}{2}\rho\overline{\Omega R}^2 C^2 R dx (x + \mu_x \sin\psi)^2 C_{Mo2} +$$

$$\int_e^1 \tfrac{1}{2}\rho\overline{\Omega R}^2 C^2 R dx (x + \mu_x \sin\psi)^2 C_{Mo}$$

Considering torsional deflection, we adopt the modal approach since it allows significant simplifications. First, consider only motions in the fundamental torsional mode; the second and higher order modes are generally stiff enough for their motion to remain negligible. Again ignoring mass forces, the resulting motion in the torsion mode will be proportional to the integral of the mode shape times the applied forcing distribution:

$$\phi_{TIP}\alpha \int_0^l \tfrac{1}{2}\rho\bar{\Omega}R^2 C^2 R(x + \mu_x\sin\psi)^2 \rho(x) C_{Mo2} dx +$$

$$\int_e^1 \tfrac{1}{2}\rho\bar{\Omega}R^2 C^2 R(x + \mu_x\sin\psi)^2 \rho(x) C_{Mo1} dx$$

where $\rho(x)$ is the non dimensional mode shape. There are two extreme cases. If the blade is soft relative to the control system or root constraint all the torsional deflection will take place as twisting of the blade and the mode shape can be approximated by:

$$\rho(x) \; \Omega \; x.$$

Alternatively if the blade is stiff relative to the control system the blade will effectively rotate as a body and:

$$\rho(x) \; \Omega \; 1.$$

In the latter case, the equation governing torsional deflection is identical to that governing the control loads or blade root moment. To investigate further: harmonically analyse, integrate radially, and form a quotient by dividing by the integral produced when $e=0$ i.e. a blade of uniform camber. The following ratios result at zero forward speed:

| Harmonic | | $\rho(x) = 1$ | $\rho(x) = x$ |
|---|---|---|---|
| Steady | | $1 + \left(\dfrac{C_{Mo2} - 1}{C_{Mo1}}\right) e^3$ | $1 + \left(\dfrac{C_{Mo2} - 1}{C_{Mo1}}\right) e^4$ |
| 1 | $\int M\rho(x)dx / \int M\rho(x)dx\vert_{e=o}$ | $1 + \left(\dfrac{C_{Mo2} - 1}{C_{Mo1}}\right) e^2$ | $1 + \left(\dfrac{C_{Mo2} - 1}{C_{Mo1}}\right) e^3$ |
| 2 | | $1 + \left(\dfrac{C_{Mo2} - 1}{C_{Mo1}}\right) e$ | $1 + \left(\dfrac{C_{Mo2} - 1}{C_{Mo1}}\right) e^2$ |
| | | stiff blade | soft blade |

The expressions for each harmonic are quite similar in form. A value of the ratio $C_{Mo2}/C_{Mo1}$ can be chosen to zero any particular harmonic; for soft blade, the motion and control load of a particular harmonic cannot be made zero at the same time. If a particular motion or control load harmonic is set to zero, there will be left over motions or control loads in other harmonics. In addition, in the general case which is not shown above, the ratio for the steady harmonic component is also a function of advance ratio.

For the soft blade case ($\rho(x)=x$) the ratios may be written in full:

$$\text{steady:} \; \frac{\int M \cdot \rho(x) dx}{\int M \cdot \rho(x) dx\vert_{e=o}} = 1 + \left(\frac{C_{Mo2} - 1}{C_{Mo1}}\right)\left(\frac{e^4 + \mu^2 e^2}{1 + \mu^2}\right)$$

$$1: \; \frac{\int M \cdot \rho(x) dx}{\int M \cdot \rho(x) dx\vert_{e=o}} = 1 + \left(\frac{C_{Mo2} - 1}{C_{Mo1}}\right) e^3$$

$$2: \; \frac{\int M \cdot \rho(x) dx}{\int M \cdot \rho(x) dx\vert_{e=o}} = 1 + \left(\frac{C_{Mo2} - 1}{C_{Mo1}}\right) e^3$$

The important once/rev component of torsional motion, may therefore be set to zero for all forward speeds through suitable choice of the ratio $C_{Mo2}/C_{Mo1}$ for a given value of e. The steady will also be reduced significantly at all forward speeds and the second harmonic motion will be reduced to a constant fraction of what it would have been if the high performance outboard section had been used uniformly down the span of the blade.

For this case if $e=0.7$ and the strategy is to zero the $1\Omega$ torsion motion, then $C_{Mo2}/C_{Mo1} = -1.915$ or the nose up of the inboard section must be nearly twice the nose down basic moment of the outboard section.

The resulting motion and root moment ratios at an advance ratio of 0.4 are:

| Harmonic | Motion | Root Moment |
|---|---|---|
| steady | 0.200 | 0.2012 |
| 1 | 0.0 | −0.428 |
| 2 | −0.428 | −1.04 |

It should be remembered that this is an extreme case. The steady motion and root moment are reduced to twenty percent of the value for a uniform section blade; the second harmonic motion is more than halved while the vibratory root moment is reversed in sign. Generally, there will be a higher harmonic motion in torsion which will be modified by the introduction of camber distribution. Usually, the introduction of camber distribution reduces this motion. It is advantageous to make rotor blades which are stiff relative to the control system or root fitting since then motions and root moments may be made to cancel simultaneously.

Thus, the present invention provides a rotor blade in which the advantages of aerofoil sections of high basic pitching moment may be extended to helicopters or autogyro main rotors, or rotors with blades relatively supple in torsion.

The construction employed minimises the effects of high basic pitching moments, high blade root torsional moments and control loads, and undesirable blade torsional motion, thus allowing the rotor blade to behave in a conventional manner while attaining high levels of blade loading. This is achieved by offsetting the high moments produced by high performance sections used in outboard regions of the blade with sections of reduced or reflexed camber used inboard in regions less critical from a performance point of view.

Several strategies may be adopted in designing a particular blade geometry, and the design process involves consideration of manufacturing techniques, design speed of the rotor, and the relative stiffness of the rotor blade and control system or root fittings in torsion, as well as the details of the outboard blade design to derive a particular blade geometry.

I claim as my invention:

1. A helicopter rotor blade having a root end for attachment to a rotor head, a tip end defining the end of the blade furthest from the root end, and a central portion of aerofoil section extending between and attached to the root end and the tip end, wherein an outboard region of the central portion has a negative basic pitching moment coefficient of absolute value not less than 0.02 and an inboard region has a basic pitching moment coefficient more positive than that of the outboard region.

2. A rotor blade as claimed in claim 1, characterised in that said outboard region comprises a region outboard of a seventy percent rotor radius station.

3. A rotor blade as claimed in claim 2, characterised in that said outboard region extends between said seventy percent station and an eighty percent rotor radius station.

4. A rotor blade as claimed in claim 1, characterised in that said inboard and outboard regions and said outboard and tip regions are blended smoothly together.

5. A rotor blade as claimed in claim 1, characterised in that the respective pitching moment characteristics of the inboard and outboard regions of said central portion are obtained by camber distribution in the respective regions.

6. A rotor blade as claimed in claim 5, characterised in that the camber of the aerofoil section of said inboard region comprises a reflex camber.

7. A rotor blade as claimed in claim 1, characterised in that said tip end is swept rearwardly with respect to said central portion.

8. A rotor blade as claimed in claim 1, characterised in that a thickness to chord ratio of said tip end is less than that of said central portion.

9. A helicopter rotor blade having a root end (14) for attachment to a rotor head, a tip end (15) defining the end of the blade farthest from the root end, and a central portion (16) of aerofoil section extending between and attached to the root end and the tip end and co-operating therewith to define a rotor radius, characterised in that an outboard region (18) of said central portion has a negative basic pitching moment coefficient and an inboard region (17) of said central portion has a positive basic pitching moment coefficient.

10. A helicopter rotor blade as claimed in claim 9, characterised in that said negative and positive basic pitching moment coefficients have an absolute value greater than 0.02.

11. A helicopter rotor blade as claimed in claim 10, characterised in that the basic pitching moment coefficient of said outboard region is between minus 0.02 and minus 0.04 and that of said inboard region is between 0.02 and 0.04.

12. A rotor blade as claimed in claim 1, characterized in that said outboard region is highly cambered and said inboard region has a reduced camber relative to said outboard region.

13. A helicopter rotor blade as claimed in claim 10, characterized in that said outboard region is highly cambered and said inboard region is reflex cambered.

* * * * *